(12) United States Patent
Idris Shah et al.

(10) Patent No.: US 10,914,949 B2
(45) Date of Patent: Feb. 9, 2021

(54) IMAGE SIZE TRIGGERED CLARIFICATION TO MAINTAIN IMAGE SHARPNESS

(71) Applicant: Magic Leap, Inc., Plantation, FL (US)

(72) Inventors: Syed Idris Shah, Lauderhill, FL (US); Henricus Cabanier, Seattle, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/682,911

(22) Filed: Nov. 13, 2019

(65) Prior Publication Data
US 2020/0159016 A1 May 21, 2020

Related U.S. Application Data

(60) Provisional application No. 62/768,705, filed on Nov. 16, 2018, provisional application No. 62/842,844, filed on May 3, 2019.

(51) Int. Cl.
| | | |
|---|---|---|
| *G02B 27/01* | (2006.01) | |
| *G06T 5/00* | (2006.01) | |
| *G06T 3/40* | (2006.01) | |
| *G06T 11/00* | (2006.01) | |

(52) U.S. Cl.
CPC ............ *G02B 27/0101* (2013.01); *G06T 3/40* (2013.01); *G06T 5/003* (2013.01); *G02B 27/017* (2013.01); *G02B 2027/011* (2013.01); *G02B 2027/014* (2013.01); *G02B 2027/0127* (2013.01); *G02B 2027/0147* (2013.01); *G06T 11/00* (2013.01)

(58) Field of Classification Search
CPC . G06T 3/40; G06T 5/003; G06T 11/00; G06T 5/00; G06T 5/001; G06T 5/004; G06F 3/0481; G06F 3/0488; G06F 3/14; G06F 16/9577; H04L 67/2823; G02B 27/0101; G02B 2027/011; G02B 2027/0127; G02B 2027/014; G02B 2027/0147; G02B 27/017; G02B 2027/0187
See application file for complete search history.

(56) References Cited

U.S. PATENT DOCUMENTS

| | | |
|---|---|---|
| 4,344,092 A | 8/1982 | Miller |
| 4,652,930 A | 3/1987 | Crawford |
| 4,810,080 A | 3/1989 | Grendol et al. |

(Continued)

FOREIGN PATENT DOCUMENTS

| | | |
|---|---|---|
| EP | 0535402 A1 | 4/1993 |
| EP | 1215522 A2 | 6/2002 |

(Continued)

OTHER PUBLICATIONS

International Search Report and Written Opinion dated Feb. 7, 2020, International PCT Patent Application No. PCT/US2019/061265, (11 pages).

(Continued)

*Primary Examiner* — Julie Anne Watko
(74) *Attorney, Agent, or Firm* — Stephen M. De Klerk

(57) ABSTRACT

An application engine renders an image based on image data from a content source. A display engine displays the image to a user. The image is adjustable from a first size to a second size. A detection system detects the size adjustment. An application executes a clarification routine to maintain sharpness of the image.

86 Claims, 11 Drawing Sheets

(56) References Cited

U.S. PATENT DOCUMENTS

| | | | |
|---|---|---|---|
| 4,997,268 A | 3/1991 | Dauvergne |
| 5,007,727 A | 4/1991 | Kahaney et al. |
| 5,074,295 A | 12/1991 | Willis |
| 5,240,220 A | 8/1993 | Elberbaum |
| 5,455,625 A | 10/1995 | Englander |
| 5,495,286 A | 2/1996 | Adair |
| 5,497,463 A | 3/1996 | Stein et al. |
| 5,682,255 A | 10/1997 | Friesem et al. |
| 5,864,365 A | 1/1999 | Sramek et al. |
| 6,012,811 A | 1/2000 | Chao et al. |
| 6,016,160 A | 1/2000 | Coombs et al. |
| 6,076,927 A | 6/2000 | Owens |
| 6,191,809 B1 | 2/2001 | Hori et al. |
| 6,375,369 B1 | 4/2002 | Schneider et al. |
| 6,541,736 B1 | 4/2003 | Huang et al. |
| 6,757,068 B2 | 6/2004 | Foxlin |
| 7,431,453 B2 | 10/2008 | Hogan |
| 7,573,640 B2 | 8/2009 | Nivon et al. |
| 7,724,980 B1 * | 5/2010 | Shenzhi .................. G06T 5/003 348/625 |
| 7,751,662 B2 | 7/2010 | Kleemann |
| 8,246,408 B2 | 8/2012 | Elliott |
| 8,508,676 B2 | 8/2013 | Silverstein et al. |
| 8,619,365 B2 | 12/2013 | Harris et al. |
| 8,847,988 B2 | 9/2014 | Geisner et al. |
| 9,095,437 B2 | 8/2015 | Boyden et al. |
| 9,581,820 B2 | 2/2017 | Robbins |
| 9,671,566 B2 | 6/2017 | Abovitz et al. |
| 9,671,615 B1 | 6/2017 | Vallius et al. |
| 9,874,664 B2 | 1/2018 | Stevens et al. |
| 9,955,862 B2 | 5/2018 | Freeman et al. |
| 10,018,844 B2 | 7/2018 | Levola et al. |
| 10,218,679 B1 | 2/2019 | Jawahar |
| 2002/0071050 A1 | 6/2002 | Homberg |
| 2002/0122648 A1 | 9/2002 | Mule' et al. |
| 2002/0140848 A1 | 10/2002 | Cooper et al. |
| 2003/0048456 A1 | 3/2003 | Hill |
| 2003/0067685 A1 | 4/2003 | Niv |
| 2003/0077458 A1 | 4/2003 | Korenaga et al. |
| 2004/0001533 A1 | 1/2004 | Tran et al. |
| 2004/0021600 A1 | 2/2004 | Wittenberg |
| 2004/0186902 A1 | 9/2004 | Stewart |
| 2005/0001977 A1 | 1/2005 | Zelman |
| 2005/0157159 A1 | 7/2005 | Komiya et al. |
| 2005/0273792 A1 | 12/2005 | Inohara et al. |
| 2006/0013435 A1 | 1/2006 | Rhoads |
| 2006/0015821 A1 | 1/2006 | Jacques Parker et al. |
| 2006/0038880 A1 | 2/2006 | Starkweather et al. |
| 2006/0050224 A1 | 3/2006 | Smith |
| 2006/0126181 A1 | 6/2006 | Levola |
| 2006/0132914 A1 | 6/2006 | Weiss et al. |
| 2006/0221448 A1 | 10/2006 | Nivon et al. |
| 2007/0188837 A1 | 8/2007 | Shimizu et al. |
| 2007/0204672 A1 | 9/2007 | Huang et al. |
| 2007/0283247 A1 | 12/2007 | Brenneman et al. |
| 2008/0002259 A1 | 1/2008 | Ishizawa et al. |
| 2008/0002260 A1 | 1/2008 | Arrouy et al. |
| 2008/0043334 A1 | 2/2008 | Itzkovitch et al. |
| 2008/0063802 A1 | 3/2008 | Maula et al. |
| 2008/0146942 A1 | 6/2008 | Dala-Krishna |
| 2008/0205838 A1 | 8/2008 | Crippa et al. |
| 2009/0153797 A1 | 6/2009 | Allon et al. |
| 2009/0245730 A1 | 10/2009 | Kleemann |
| 2009/0310633 A1 | 12/2009 | Ikegami |
| 2010/0056274 A1 | 3/2010 | Uusitalo et al. |
| 2010/0063854 A1 | 3/2010 | Purvis et al. |
| 2010/0079841 A1 | 4/2010 | Levola |
| 2010/0232016 A1 | 9/2010 | Landa et al. |
| 2010/0244168 A1 | 9/2010 | Shiozawa et al. |
| 2010/0296163 A1 | 11/2010 | Sarikko |
| 2011/0050655 A1 | 3/2011 | Mukawa |
| 2011/0122240 A1 | 5/2011 | Becker |
| 2011/0145617 A1 | 6/2011 | Thomson et al. |
| 2011/0170801 A1 | 7/2011 | Lu et al. |
| 2011/0218733 A1 | 9/2011 | Hamza et al. |
| 2011/0286735 A1 | 11/2011 | Temblay |
| 2011/0291969 A1 | 12/2011 | Rashid et al. |
| 2012/0050535 A1 | 3/2012 | Densham et al. |
| 2012/0154557 A1 | 6/2012 | Perez et al. |
| 2012/0218301 A1 | 8/2012 | Miller |
| 2012/0246506 A1 | 9/2012 | Knight |
| 2012/0249416 A1 | 10/2012 | Maciocci et al. |
| 2012/0307075 A1 | 12/2012 | Margalit |
| 2012/0326948 A1 | 12/2012 | Crocco et al. |
| 2013/0050833 A1 | 2/2013 | Lewis et al. |
| 2013/0077170 A1 | 3/2013 | Ukuda |
| 2013/0094148 A1 | 4/2013 | Sloane |
| 2013/0169923 A1 | 7/2013 | Schnoll et al. |
| 2013/0336138 A1 | 12/2013 | Venkatraman et al. |
| 2014/0016821 A1 | 1/2014 | Arth et al. |
| 2014/0022819 A1 | 1/2014 | Oh et al. |
| 2014/0119598 A1 | 5/2014 | Ramachandran et al. |
| 2014/0126769 A1 | 5/2014 | Reitmayr et al. |
| 2014/0140653 A1 | 5/2014 | Brown et al. |
| 2014/0149573 A1 | 5/2014 | Tofighbakhsh et al. |
| 2014/0168260 A1 | 6/2014 | O'Brien et al. |
| 2014/0267419 A1 | 9/2014 | Ballard et al. |
| 2014/0274391 A1 | 9/2014 | Stafford |
| 2015/0005785 A1 | 1/2015 | Olson |
| 2015/0009099 A1 | 1/2015 | Queen |
| 2015/0123966 A1 | 5/2015 | Newman |
| 2015/0134995 A1 | 5/2015 | Park et al. |
| 2015/0138248 A1 | 5/2015 | Schrader |
| 2015/0155939 A1 | 6/2015 | Oshima et al. |
| 2015/0235431 A1 | 8/2015 | Schowengerdt |
| 2015/0256484 A1 | 9/2015 | Cameron |
| 2015/0269784 A1 | 9/2015 | Miyawaki et al. |
| 2015/0294483 A1 | 10/2015 | Wells et al. |
| 2015/0301955 A1 | 10/2015 | Yakovenko et al. |
| 2015/0338915 A1 | 11/2015 | Publicover et al. |
| 2015/0355481 A1 | 12/2015 | Hilkes et al. |
| 2016/0077338 A1 | 3/2016 | Robbins et al. |
| 2016/0085300 A1 | 3/2016 | Robbins et al. |
| 2016/0093099 A1 | 3/2016 | Bridges |
| 2016/0123745 A1 | 5/2016 | Cotier et al. |
| 2016/0155273 A1 | 6/2016 | Lyren et al. |
| 2016/0180596 A1 | 6/2016 | Gonzalez del Rosario |
| 2016/0202496 A1 | 7/2016 | Billetz et al. |
| 2016/0217624 A1 | 7/2016 | Finn et al. |
| 2016/0321551 A1 | 11/2016 | Priness et al. |
| 2016/0327798 A1 | 11/2016 | Xiao et al. |
| 2016/0357255 A1 | 12/2016 | Lindh et al. |
| 2016/0370510 A1 | 12/2016 | Thomas |
| 2017/0038607 A1 | 2/2017 | Camara |
| 2017/0061696 A1 | 3/2017 | Li et al. |
| 2017/0100664 A1 | 4/2017 | Osterhout et al. |
| 2017/0115487 A1 | 4/2017 | Travis |
| 2017/0127295 A1 | 5/2017 | Black et al. |
| 2017/0147066 A1 | 5/2017 | Katz et al. |
| 2017/0160518 A1 | 6/2017 | Lanman et al. |
| 2017/0192239 A1 | 7/2017 | Nakamura et al. |
| 2017/0205903 A1 | 7/2017 | Miller et al. |
| 2017/0206668 A1 | 7/2017 | Poulos et al. |
| 2017/0213388 A1 | 7/2017 | Margolis et al. |
| 2017/0232345 A1 | 8/2017 | Rofougaran et al. |
| 2017/0235142 A1 | 8/2017 | Wall et al. |
| 2017/0281054 A1 | 10/2017 | Stever et al. |
| 2017/0329137 A1 | 11/2017 | Tervo |
| 2017/0332098 A1 | 11/2017 | Rusanovskyy et al. |
| 2017/0357332 A1 | 12/2017 | Balan et al. |
| 2018/0059305 A1 | 3/2018 | Popvich et al. |
| 2018/0067779 A1 | 3/2018 | Pillalamarri et al. |
| 2018/0070855 A1 | 3/2018 | Eichler |
| 2018/0088185 A1 | 3/2018 | Woods et al. |
| 2018/0102981 A1 | 4/2018 | Kurtzman et al. |
| 2018/0190017 A1 | 7/2018 | Mendez et al. |
| 2018/0250589 A1 | 9/2018 | Cossairt et al. |

FOREIGN PATENT DOCUMENTS

| | | |
|---|---|---|
| EP | 3236211 A1 | 10/2007 |
| EP | 1938141 A1 | 7/2008 |
| EP | 1943556 A2 | 7/2008 |
| EP | 2723240 B1 | 8/2018 |

(56) References Cited

FOREIGN PATENT DOCUMENTS

| | | |
|---|---|---|
| JP | 2003-029198 A | 1/2003 |
| JP | 2009-244869 A | 10/2009 |
| JP | 2012-015774 A | 1/2012 |
| JP | 6232763 B2 | 11/2017 |
| WO | 2002/071315 A2 | 9/2002 |
| WO | 2006132614 A1 | 12/2006 |
| WO | 2007/085682 A1 | 8/2007 |
| WO | 2007/102144 A1 | 9/2007 |
| WO | 2013/049012 A1 | 4/2013 |
| WO | 2016/054092 A1 | 4/2016 |
| WO | 2018/044537 A1 | 3/2018 |
| WO | 2018087408 A1 | 5/2018 |
| WO | 2018166921 A1 | 9/2018 |

OTHER PUBLICATIONS

Communication Pursuant to Article 94(3) EPC dated Sep. 4, 2019, European Patent Application No. 10793707.0, (4 pages).

Examination Report dated Jun. 19, 2020, European Patent Application No. 20154750.2, (10 pages).

Extended European Search Report dated May 20, 2020, European Patent Application No. 20154070.5, (7 pages).

Extended European Search Report dated Jun. 12, 2017, European Patent Application No. 16207441.3, (8 pages).

Final Office Action dated Aug. 10, 2020, U.S. Appl. No. 16/225,961, (13 pages).

Final Office Action dated Dec. 4, 2019, U.S. Appl. No. 15/564,517, (15 pages).

Final Office Action dated Feb. 19, 2020, U.S. Appl. No. 15/552,897, (17 pages).

International Search Report and Written Opinion dated Mar. 12, 2020, International PCT Patent Application No. PCT/US19/67919, (14 pages).

International Search Report and Written Opinion dated Aug. 15, 2019, International PCT Patent Application No. PCT/US19/33987, (20 pages).

International Search Report and Written Opinion dated Jun. 15, 2020, International PCT Patent Application No. PCT/US2020/017023, (13 pages).

International Search Report and Written Opinion dated Oct. 16, 2019, International PCT Patent Application No. PCT/US19/43097, (10 pages).

International Search Report and Written Opinion dated Oct. 16, 2019, International PCT Patent Application No. PCT/US19/36275, (10 pages).

International Search Report and Written Opinion dated Oct. 16, 2019, International PCT Patent Application No. PCT/US19/43099, (9 pages).

International Search Report and Written Opinion dated Jun. 17, 2016, International PCT Patent Application No. PCT/FI2016/050172, (9 pages).

International Search Report and Written Opinion dated Oct. 22, 2019, International PCT Patent Application No. PCT/US19/43751, (9 pages).

International Search Report and Written Opinion dated Dec. 23, 2019, International PCT Patent Application No. PCT/US19/44953, (11 pages).

International Search Report and Written Opinion dated May 23, 2019, International PCT Patent Application No. PCT/US18/66514, (17 pages).

International Search Report and Written Opinion dated Sep. 26, 2019, International PCT Patent Application No. PCT/US19/40544, (12 pages).

International Search Report and Written Opinion dated Aug. 27, 2019, International PCT Application No. PCT/US2019/035245, (8 pages).

International Search Report and Written Opinion dated Dec. 27, 2019, International Application No. PCT/US19/47746, (16 pages).

International Search Report and Written Opinion dated Sep. 30, 2019, International Patent Application No. PCT/US19/40324, (7 pages).

International Search Report and Written Opinion dated Jun. 5, 2020, International Patent Application No. PCT/US20/19871, (9 pages).

International Search Report and Written Opinion dated Aug. 8, 2019, International PCT Patent Application No. PCT/US2019/034763, (8 pages).

International Search Report and Written Opinion dated Oct. 8, 2019, International PCT Patent Application No. PCT/US19/41151, (7 pages).

International Search Report and Written Opinion dated Jan. 9, 2020, International Application No. PCT/US19/55185, (10 pages).

International Search Report and Written Opinion dated Feb. 28, 2019, International Patent Application No. PCT/US18/64686, (8 pages).

International Search Report and Written Opinion dated Jun. 11, 2019, International PCT Application No. PCT/US19/22620, (7 pages).

Invitation to Pay Additional Fees dated Aug. 15, 2019, International PCT Patent Application No. PCT/US19/36275, (2 pages).

Invitation to Pay Additional Fees dated Oct. 22, 2019, International PCT Patent Application No. PCT/US19/47746, (2 pages).

Invitation to Pay Additional Fees dated Apr. 3, 2020, International Patent Application No. PCT/US20/17023, (2 pages).

Invitation to Pay Additional Fees dated Oct. 17, 2019, International PCT Patent Application No. PCT/US19/44953, (2 pages).

Non Final Office Action dated Aug. 21, 2019, U.S. Appl. No. 15/564,517, (14 pages).

Non Final Office Action dated Jul. 27, 2020, U.S. Appl. No. 16/435,933, (16 pages).

Non Final Office Action dated Jun. 19, 2020, U.S. Appl. No. 16/225,961, (35 pages).

Non Final Office Action dated Nov. 19, 2019, U.S. Appl. No. 16/355,611, (31 pages).

Non Final Office Action dated Oct. 22, 2019, U.S. Appl. No. 15/859,277, (15 pages).

Non Final Office Action dated Sep. 1, 2020, U.S. Appl. No. 16/214,575, (40 pages).

Notice of Allowance dated Mar. 25, 2020, U.S. Appl. No. 15/564,517, (11 pages).

Summons to attend oral proceedings pursuant to Rule 115(1) EPC mailed on Jul. 15, 2019, European Patent Application No. 15162521.7, (7 pages).

Aarik, J. et al., "Effect of crystal structure on optical properties of TiO2 films grown by atomic layer deposition", Thin Solid Films; Publication [online]. May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).

Azom, "Silica-Silicon Dioxide (SiO2)", AZO Materials; Publication [Online]. Dec. 13, 2001 [retrieved Feb. 19, 2020]. Retrieved from the Internet: <URL: https://www.azom.com/article.aspx?ArticleID=1114>, (6 pages).

Goodfellow, "Titanium Dioxide-Titania (TiO2)", AZO Materials; Publication [online]. Jan. 11, 2002 [retrieved Feb. 19, 2020]. Retrieved from the Internet: <URL: https://www.azom.com/article.aspx?ArticleID=1179>, (9 pages).

Levola, T. , "Diffractive Optics for Virtual Reality Displays", Journal of the SID Eurodisplay 14/05, 2005, XP008093627, chapters 2-3, Figures 2 and 10, pp. 467-475.

Levola, Tapani , "Invited Paper: Novel Diffractive Optical Components for Near to Eye Displays—Nokia Research Center", SID 2006 Digest, 2006 SID International Symposium, Society for Information Display, vol. XXXVII, May 24, 2005, chapters 1-3, figures 1 and 3, pp. 64-67.

Memon, F. et al., "Synthesis, Characterization and Optical Constants of Silicon Oxycarbide", EPJ Web of Conferences; Publication [online]. Mar. 23, 2017 [retrieved Feb. 19, 2020].<URL: https://www.epj-conferences.org/articles/epjconf/pdf/2017/08/epjconf_nanop2017_00002.pdf>; DOI: 10.1051/epjconf/201713900002, (8 pages).

(56) References Cited

OTHER PUBLICATIONS

Spencer, T. et al., "Decomposition of poly(propylene carbonate) with UV sensitive iodonium 11 salts", Polymer Degradation and Stability; (online]. Dec. 24, 2010 (retrieved Feb. 19, 2020]., <URL: http:/fkohl.chbe.gatech.edu/sites/default/files/linked_files/publications/2011Decomposition%20of%20poly(propylene%20carbonate)%20with%20UV%20sensitive%20iodonium%20salts,pdf>; DOI: 10,1016/j.polymdegradstab.2010, 12.003, (17 pages).

Weissel, et al., "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>, p. 238-246.

Invitation to Pay Additional Fees dated Sep. 24, 2020, International Patent Application No. PCT/US2020/043596, (3 pages).

Notice of Reason of Refusal dated Sep. 11, 2020 with English translation, Japanese Patent Application No. 2019-14035, (6 pages).

\* cited by examiner

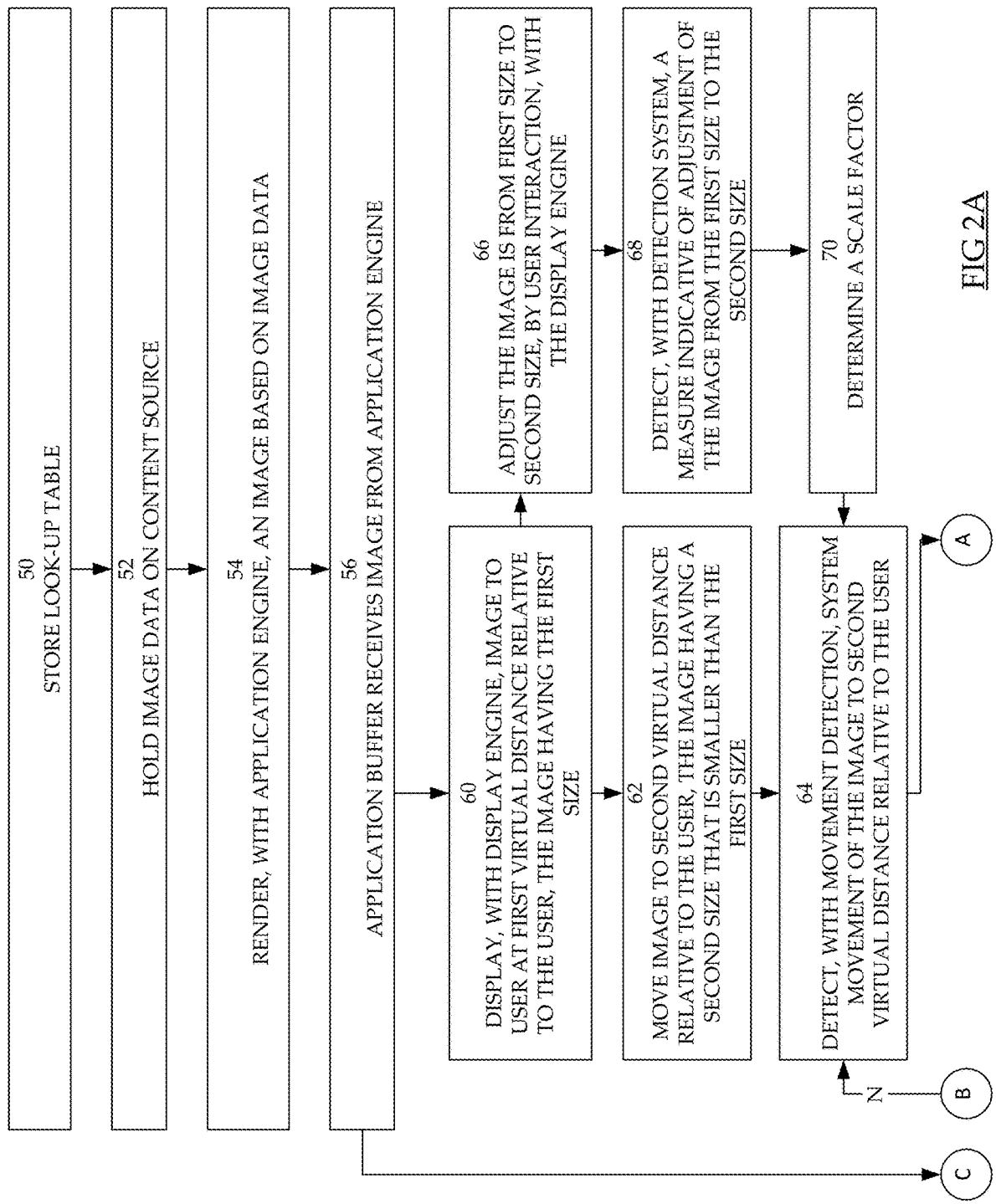

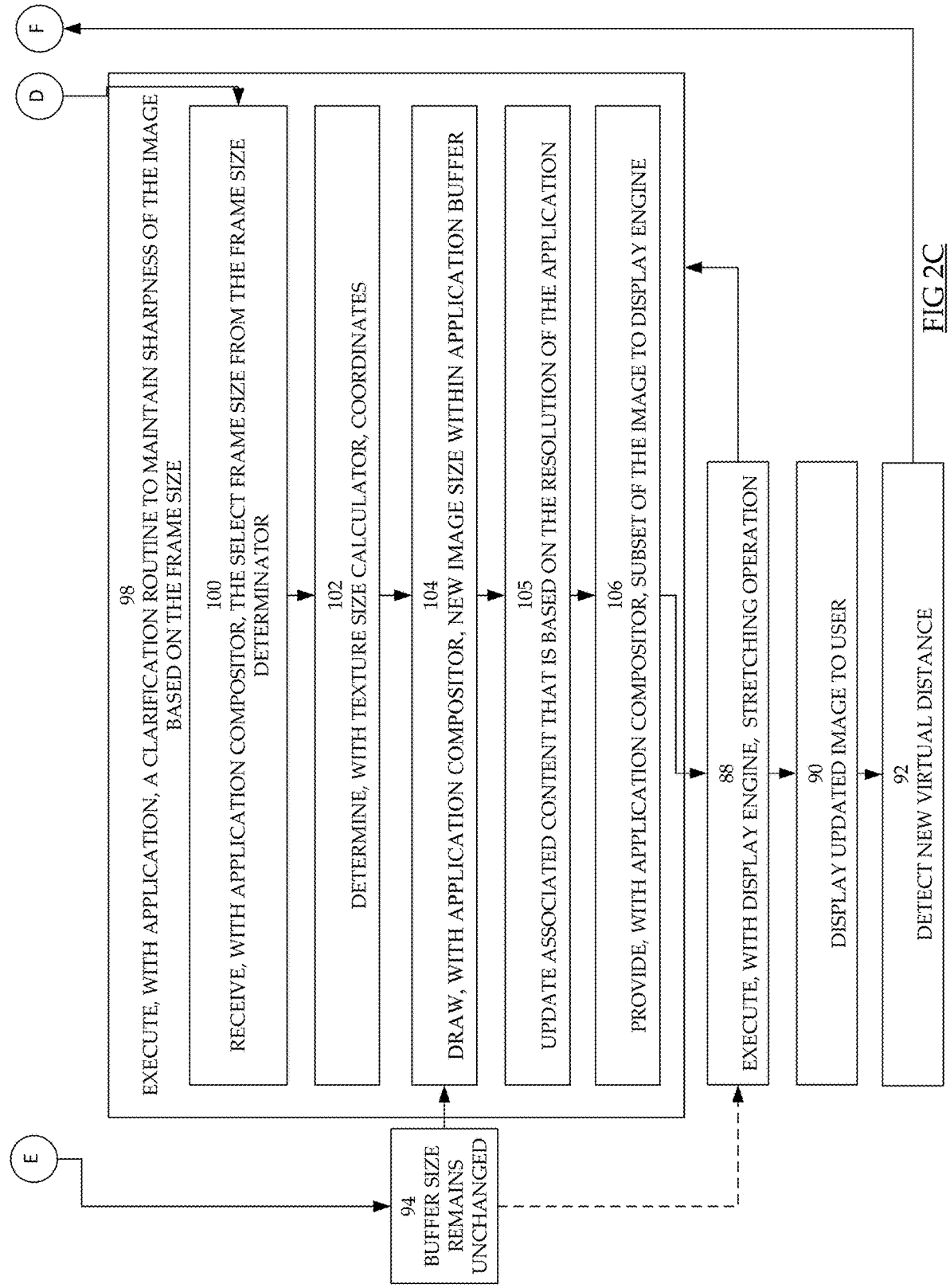

IMAGE SIZE TRIGGERED CLARIFICATION TO MAINTAIN IMAGE SHARPNESS

CROSS-REFERENCE TO RELATED APPLICATIONS

This application claims priority from U.S. Provisional Patent Application No. 62/768,705, filed on Nov. 16, 2018 and U.S. Provisional Patent Application No. 62/842,844, filed on May 3, 2019, all of which are incorporated herein by reference in their entirety.

BACKGROUND OF THE INVENTION

1). Field of the Invention

This invention relates to a viewing system and to a method of viewing content.

2). Discussion of Related Art

A personal computer usually has a stand-alone screen in the form of a laptop screen or a separate screen that is connected to a central processing unit. Applications that display images, such as browsers that display browser windows and content in web pages, word processing applications that display windows with text in the windows, or the like, are designed to display such content so that the user can typically read the content comfortably between a distance 0.25 meters and 1 meters. When the user moves further away from the display, the content simply becomes smaller within the view of the user.

Three-dimensional viewing systems are also sometimes used for viewing content. A three-dimensional viewing system may have a head-mountable frame and left and right displays in front of left and right eyes of a user. The displays may create images or project images that are slightly different from one another to give the user the impression of depth. Alternatively, or additionally, a respective display may adjust a focal length to various depths.

The user can, for example, receive a browser window with a web page at a distance of 2 meters from the user. In addition, the browser window can move towards the user or away from the user following user interaction with sensors that are usually located on the head-mountable unit and track movement of the head of the user and/or body parts of the user.

SUMMARY OF THE INVENTION

The invention provides a viewing system including a content source to hold image data, an application engine, forming part of an application, communicatively connected to the content source to receive the image data and render an image based on the image data, a display engine communicatively connected to the application engine to display the image to a user, the image having a first size, the image being adjustable to a second size that is smaller than the first size, and a detection system that detects a measure indicative of adjustment of the image from the first size to the second size, wherein the application, in response to the detection, executes a clarification routine to maintain sharpness of the image.

The invention also provides a method of viewing content including rendering, with an application engine, an image based on image data from a content source, displaying, with a display engine, the image to a user and the image having a first size, the image being adjustable to a second size that is smaller than the first size, detecting, with a detection system, a measure indicative of adjustment of the image from the first size to the second size and executing, with an application, based on the detection, a clarification routine to maintain sharpness of the image.

BRIEF DESCRIPTION OF THE DRAWINGS

The invention is further described by way of examples with reference to the accompanying drawings, wherein:

FIGS. 2A, 2B and 2C are a flow chart illustrating functioning of the viewing system in FIG. 1;

DETAILED DESCRIPTION OF THE INVENTION

Figure 1:
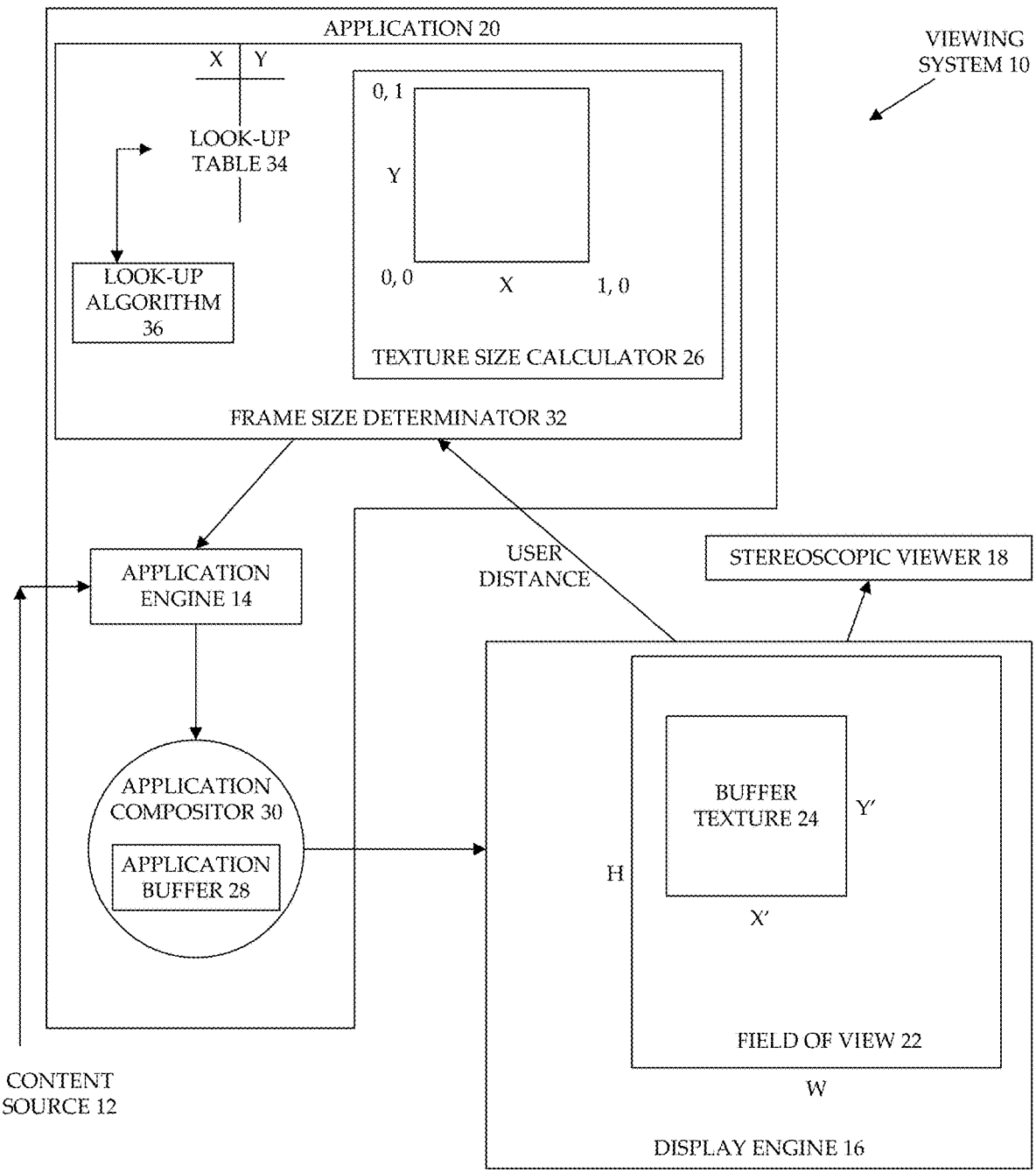
FIG. 1 is a block diagram of a viewing system according to a first embodiment of the invention.

FIG. 1 of the accompanying drawings illustrates a viewing system 10, according to an embodiment of the invention, including a content source 12, a display engine 16, a stereoscopic viewer 18, and an application 20. The viewing system 10 may use a re-scale routine to maintain sharpness of an image.

The display engine 16 and the application 20 are software systems that reside on a computer-readable storage medium and are executable by a processor of the viewing system 10. The display engine 16 and the application 20 are communicatively connected to one another through calls and subroutines as will be commonly understood by one of skill in the art.

The stereoscopic viewer 18 is a hardware component that is connected to the processor via a physical or wireless connection. The stereoscopic viewer 18 is also communicatively connected to the display engine 16.

The application 20 includes an application engine 14, an application compositor 30 and a frame size determinator 32.

The content source 12 is a hardware component that is connected to the processor. The content source 12 is also communicatively connected to the application engine 14. The content source 12 is capable of carrying image data. Such image data may for example be a still image such as a photograph or a document. The image data may alternatively be a moving image such as a document or a web page that moves when a user scrolls the document or web page, or may be successive frames of images that form a movie.

The application engine 14 may for example be a picture viewer, a document editing application, a browser, a movie viewer or the like that is capable of rendering an image based on the image data.

The display engine 16 determines a height (H) and width (W) of a field-of-view 22 that is specific to the stereoscopic viewer 18. The field-of-view 22 has a buffer texture 24 having a frame size. A "frame size" is a term that is generally used in the art for indicating the combination of a number of horizontal pixels (X') and a number of vertical pixels (Y').

The application compositor 30 has an application buffer 28. The application compositor 30 draws an image into the application buffer 28. The display engine 16 stretches the image in the application buffer 28 using the coordinates of the buffer texture 24, and then displays the image to the user.

The stereoscopic viewer 18 may have a frame that is mountable to a head of a viewer with left and right displays in front of left and right eyes of the viewer. Depending on the configuration, the display in front of the eyes may appear as a single display but may be configured to project two different images, one per eye. The stereoscopic viewer 18 receives the image from the display engine 16 and displays the image to the viewer within the field-of-view 22. The display engine 16 may display images that are slightly different to left and right eyes of the user to give the user a perception of depth. The display engine 16 may display each image at an adjustable field of depth to also give the user a perception of depth while accommodating sight-related enhancements such as "vergence accommodation". The image that is displayed within the buffer texture 24 is thus perceived by the user to be at a particular virtual distance from the user.

The frame size determinator 32 includes a texture size calculator 26, a look-up table 34 and a look-up algorithm 36. The look-up table 34 has a plurality of distances in an X-column and a plurality of frame sizes in a Y-column with each frame size corresponding to a respective distance. The frame size may, for example, be represented by a number of pixels in a single direction (e.g. frame width, or frame height, or diagonal). The frame size may then be a simply calculated by applying, for example, a fixed aspect ratio. The frame sizes decrease with increasing distance between the user and the virtual content. The look-up algorithm 36 receives a virtual distance between the user and the virtual content as an input and determines a select distance among the distances in the X-column corresponding to the virtual distance. The look-up algorithm 36 then determines a frame size corresponding to the select distance.

The look-up table 34 may have been created by first displaying an image on the viewing system 10, and then measuring the number of pixels that the image occupies on the stereoscopic viewer 18. The image may be incrementally moved away from the user and the new frame sizes measured. The distance and corresponding number of pixels may be aggregated and placed in a table to form the look-up table 34. Other suitable methods of creating the look-up table may be used. The look-up table 34 and look-up algorithm 36 may alternatively be replaced with an interpolation algorithm that may serve the same function as look-up table 34 and look-up algorithm 36, but may use one or more interpolation algorithms, such as a spline interpolation algorithm, or the like.

Figure 2B:
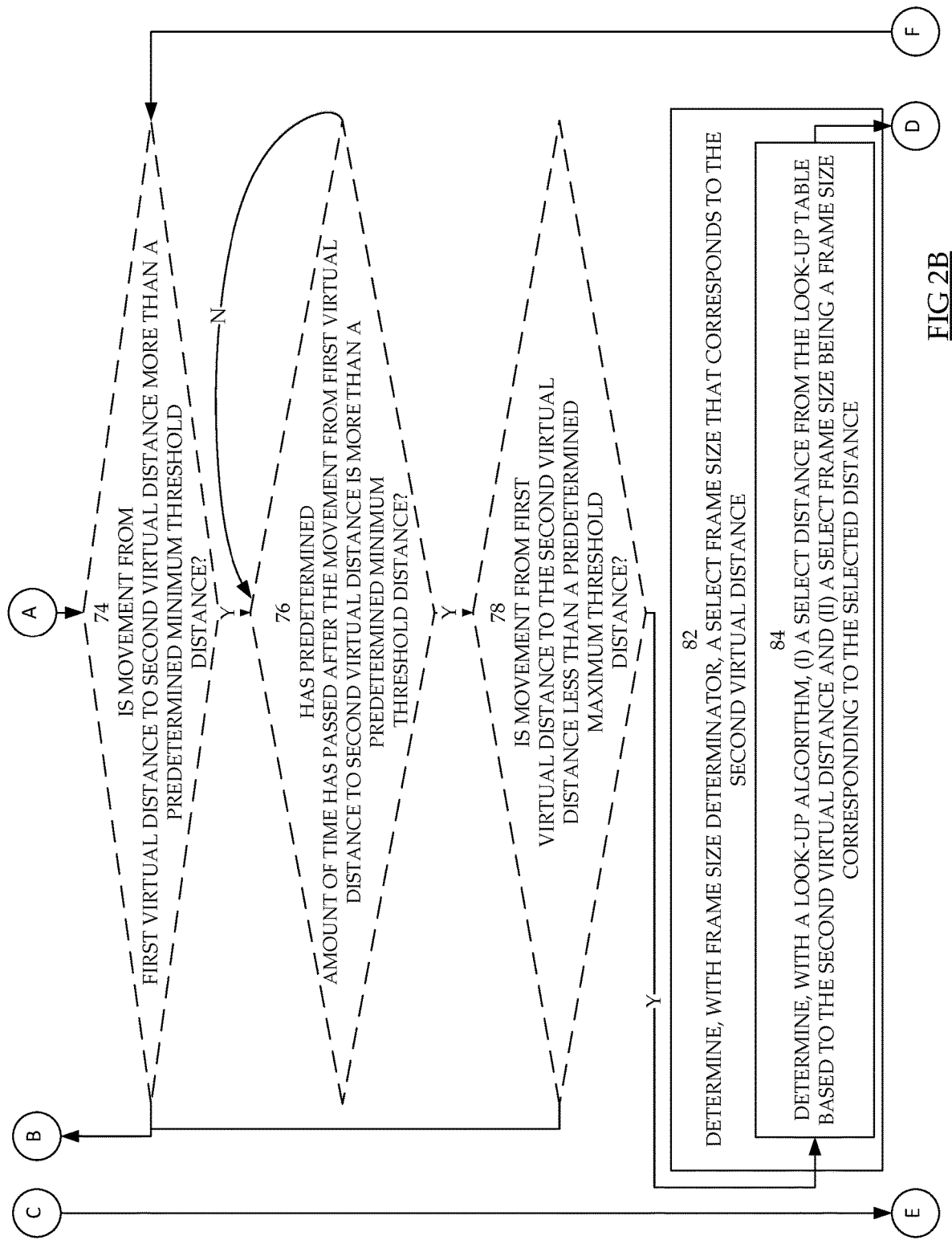

FIGS. 2A, 2B and 2C show the functioning of the viewing system 10 in more detail. At 50, the look-up table 34 is stored in memory. As noted above, the look-up table 34 has a plurality of distances and a plurality of frame sizes corresponding to the respective distances. Reference numeral 52 represents that image data is held on the content source 12. At 54, the application engine 14 renders an image based on the image data.

At 56, the application buffer 28 receives the image from the application engine 14. The application buffer 28 has a predetermined size and the image from the application engine 14 fills the application buffer 28.

At 60, the display engine 16 displays the image to the user at a first virtual distance relative to the user wherein the image has a first size. The display engine 16 may for example display a browser window or a document viewer window at a default location and with a pre-set maximum surface. The default location may be a preselected, user-friendly location where it is easy for the user to view the image. The image may comprise text, pictures, and/or other visual content. If the image comprises text, the image is preferably displayed at a default distance from the user so that the user can easily read the text.

The maximum surface may be the largest possible texture that the viewing system 10 assigns to the image. The stereoscopic viewer 18 may have a resolution of 1280×960 pixels. The viewing system 10 may assign a maximum frame size for a given application, window, or type of content, (e.g., a browser window). A browser application may be a landscape application (which means that it can be simultaneously displayed with other application windows). A browser application may not be an immersive application (wherein one application window takes over the entire field-of-view), and the assumption may therefore be made that the browser window will never take up the entire field-of-view (e.g. 1280×960), and thus a value of 1120 pixels may be chosen (e.g. with a fixed aspect ratio) because it is slightly smaller than 1280 pixels, which may allow for a border or a small portion of the field-of-view that will not contain the browser window. Choosing a maximum surface frame size of larger than 1280 pixels will exceed the resolution of the stereoscopic viewer 18, in which case the viewing system 10 may apply a minimal filter to match the display resolution when displaying the content to the user, which in turn may result in unnecessary processing power to display an image of equivalent resolution (i.e. maximum surface of 1280 pixels being equivalent to 1120 pixels after the minimal filter is applied to the 1280 pixels).

The stereoscopic viewer 18 may have a number of systems that detect movement of the stereoscopic viewer 18 relative to real world objects. For example, the stereoscopic viewer 18 may have an inertial measurement unit with one or more accelerometers that detect acceleration and a gyroscope the detects rotation of the stereoscopic viewer 18. In addition, the stereoscopic viewer 18 may have a camera system that captures images of real world objects and can track the movement of the real world objects within the view of the stereoscopic viewer 18. These systems provide "intelligence" that permit detection of movement of the stereoscopic viewer 18 relative to the real world objects. When the stereoscopic viewer 18 moves relative to the real world objects, the image that is displayed by the display engine 16 may also move within the view of the stereoscopic viewer 18. For example, if the image is displayed to the user that gives the user the impression that the image is located on a wall, and if the user walks closer to the wall, the depth that the image is displayed also moves closer to the user to give the impression to the user that the image remains on the wall. The image will also become larger within the field of view of the user.

It is also possible for the user to interact with the display engine 16 to increase the size of the image. The stereoscopic viewer 18 may, for example, have one or more cameras that can capture gestures made by a hand of a user and the viewing system 10 may interpret such gestures to increase the size of the image. The user may increase the size of the image by moving the image closer to the user or may increase the size of the image while the image remains at a stationary virtual distance relative to the user.

If the image becomes larger (e.g. the user walks towards the image), the rendered resolution may change (e.g. increase), but the size of the application buffer 28 may remain the same. Traditional systems may use a built-in re-sizing feature, broadly called "mipmapping" that may cause blurriness of the image. Mipmapping may include the use of filters that are well known in the art, for example a "mean filter", a "Gaussian smoothing filter", a 'bilinear filter", etc. For example, if a browser window moves further away and fewer pixels are available to the browser window, an averaging method may be used wherein four adjacent pixels in the first image are displayed as a single pixel in a second image. The single pixel may be given an average pixel value between 0 and 255 representing the average of the four pixels that were originally displayed (in the first image), resulting in blurriness in the second image.

At 62, the image is moved to a second virtual distance relative to the user wherein the image has a second size that is smaller than the first size. In the given example, the user may move further away from the wall and the display engine 16 may maintain the impression that the image remains on the wall by moving the image further away from the user within the view of the user which consequently also makes the image smaller. Fewer pixels are now available to display the image. Traditional mipmapping techniques may take four originally-displayed pixels, average their pixel value and display the averaged value as a single pixel. Such averaging of pixel values may result in blurriness.

Traditional systems may have been used for purposes of displaying images on stand-alone computer displays. For example, a browser window may be displayed on a traditional stand-alone computer display. A user may then use controls to zoom in to or out of a web page. Such zooming in to and out of a web page may trigger a mipmapping filtering technique. When the user moves away from the stand-alone computer display, the browser window becomes smaller within the view of the user, because it becomes smaller within the field of the view of the eye of the user. The window is not, additionally, made smaller and there is no zooming out within the window as a result of the user moving away from the stand-alone computer display. The window remains static relative to the stand-alone computer display and only becomes smaller within the field-of-view of the eye of the user. As a consequence, the image in the display does not become more blurry when the user moves away from the stand-alone computer display.

At 64, a movement detection system of the application 20 detects movement of the image to the second virtual distance relative to the user. The detection of the movement is a detection of a measure indicative that the image has become smaller. A change in a size of the image (smaller or larger) may necessitate a clarification routine to maintain sharpness (as opposed to blurriness) of the image.

At 66, the user, additionally, may interact with the display engine 16 to change the size of the image from a first size to a second size. At 68, a detection system detects a measure indicative of adjustment from the first size to the second size. At 70, in response to the detection at 68, a scale factor may be determined to account for the adjustment at 66. The scale factor may ultimately be sent to subroutine 82 (optionally, via subroutines 64, 74, 76, and/or 78), where determining the frame size may, at least in part, be determined by the scale factor. The scale factor may, for example, be determined by calculating the ratio of the displayed image before and after user manipulation. For example, an image may initially be displayed at 1280 pixels (e.g. full resolution/full buffer). The image may move away from the user, and thus be at 640 pixels (which may be determined by look-up table 34 based on the distance of the image from the user). The user may then stretch the image to make it bigger, by a scale factor of 1.5 (i.e. the image is now 50% larger than it was), resulting in a post-adjusted image having 960 pixels at the same distance as the pre-adjusted image having 640 pixels. The user may now walk towards the image. The look-up table 34 may determine that the image should be 750 pixels, based on the distance between the browser window and the user, and after the scale ratio is applied, the screen should actually be 1100 pixels. The scale factor from the look-up table 34 and given by the look-up algorithm 36, is thus multiplied by the scale ratio. Depending on the particular situation, the image may become smaller at 60 and larger at 66, smaller at 60 and smaller at 66, remain unchanged at 60 and enlarges or becomes smaller at 66, etc. For purposes of further discussion, the effect of user interaction at 66 is ignored in favor of the detection at 64 of the change in the virtual distance, wherein the virtual distance may be the distance between the user and the virtual content/image.

At 74, a determination is (optionally) made whether the movement from the first virtual distance to the second virtual distance is more than a predetermined minimum threshold distance. At 76, a determination is (optionally) made whether a predetermined minimum threshold amount of time has passed between the movement from the first virtual distance and the movement of the second virtual distance. The predetermined minimum threshold distance may, for example, be 0.25 meters. The predetermined minimum amount of time may be, for example, one second or one minute. The thresholds referred to at 74 and 76 may be set to avoid a jittery experience due to clarification updates that may be too frequent.

At 78, a determination is (optionally) made whether the movement from the first virtual distance to the second virtual distance is less than a predetermined maximum threshold distance. A predetermined maximum threshold distance may, for example, be 4 meters. If the second virtual distance is more than 4 meters, there may be no need for a clarification routine to be carried out because the image may be too small for the user to read. In particular, text on a web page or in a document may be too small for the user to see. Any image adjustment due to traditional mipmapping techniques are thus acceptable because the blurriness resulting from such techniques will not negatively effect user experience. One or more of the thresholds at 74, 76, and 78, may be determined through user testing. It may be possible to execute 74, 76, and 78 in another order or eliminate one or more of the operations.

In the described embodiment, if a determination is made that 74, 76 and 78 are all positive, then the system proceeds to 82 wherein the frame size determinator 32 determines a select frame size that corresponds to the second virtual distance. Various techniques may be employed to do the determination at 82, for example techniques based on the second virtual distance, techniques based on a match with an appropriate render size, techniques based on a final render resolution, techniques based on the number of pixels available for content display, etc. The determination at 82 includes a determination, at 84, wherein the look-up algorithm 36 (I) selects a select distance from the look-up table 34 based on the second virtual distance and (II) determines a select frame size which is the frame size corresponding to the selected distance. The selected frame size then forms the basis for a clarification routine.

Block 94 indicates that the buffer size remains unchanged from the buffer size referred to at block 56.

At 98, the application 20 executes a clarification routine that maintains sharpness of the image based on the frame size allocated to the image when displayed to the user through the stereoscopic viewer 18. It can be noted that the clarification routine is in response to the detection at 64 of the movement of the image to the second virtual distance. At 100, the application compositor 30 receives the select frame size from the frame size determinator 32. In the present example, the frame size determinator 32 has provided a selected frame size of 700.

At 102, the texture size calculator 26 calculates coordinates of the image based on the frame size. Vertical and horizontal coordinates may be adjusted by the same amount to maintain a fixed aspect ratio of the image.

At 104, the application compositor 30 draws a new image at the new image size within the application buffer 28. The size of the application buffer 28 still remains unchanged, as indicated by block 94. In the given example where the frame size reduces from 1120 to 1000, only 1000 pixels are drawn in the application buffer 28 and a proportional adjustment is made on the vertical axis of the image. The updated image thus has fewer pixels than if the entire buffer is used. By drawing fewer pixels in the application buffer 28, fewer processing cycles are required and less power is consumed than if the image fills the entire buffer.

At 105, the updated image information, such as number of pixels, size, and/or resolution, is sent to content associated with the application. Some examples of content associated with the application are application previews (e.g. a screenshot of an application that may appear upon hover of an application icon), dialogue boxes (e.g. a box that states application content can't be accessed, or a request for a user name and/or password), a control box, an information box, other pop-ups, and/or any other widgets, or views, or secondary windows that may be at least partially based on the resolution and/or size and/or number of pixels of the application or application window. The content associated with the application may, for example, be a dialogue box allowing the user to navigate files. The content associated with the application may not be content within the application window, but may be a secondary window, such as a child to the parent application window, which may be triggered and controlled by the application window. The content associated with the application window may be a preview of the application window, such as a browser application displaying a preview of a browser window. A preview may be created for use by an application history feature, and/or as a screenshot of the application window that may be displayed when a cursor hovers over an application icon. At 106, the application compositor 30 provides of the entire buffer with the updated image (and corresponding texture/UV coordinates) to the display engine 16 for display to the user.

It may in certain implementations be useful to skip the routine at 105, which may result in a preview (e.g. screen shot image) that displays the entire buffer, including the portion of the buffer that the image was not drawn into. Skipping routine 105 may thus result in the system not applying the UV coordinates to the content associated with the application window, and the preview therefore copying the full buffer frame (e.g. 1000×1000 pixels) and then drawing the full buffer frame at a smaller size (e.g. 50×50 pixels). The inclusion of routine 105 may enable the preview to only copy the portion of the buffer frame that contains the updated image, thus preventing the preview from comprising the portion of the buffer that the image was not drawn into.

In applications where the content associated with the application is a dialogue box, and the application is a browser application that displays one or more browser windows, skipping routine 105 may result in the dialogue box moving relative to the browser window every time the browser window size and/or resolution is updated. For example, the dialogue box may start in the upper right hand corner of the application window, but may appear at the center of the browser window if the distance between the user and the browser window increases. By way of example, the browser window may have a first size of 1000×1000 pixels, and the dialogue box may start at 200,200 pixels. If the 1000×1000 pixel browser window were resized to 500× 500 by all or part of the routines described in FIGS. 2A-2C, then the dialogue box would remain at 200, 200 if routine 105 is not executed. With the inclusion of routine 105 in the flow, the dialogue box would move to 100, 100 to maintain its proportional location relative to the browser window.

At 88, the display engine 16 executes a stretching operation. A stretching operation may be executed when the image is made larger or when the image is made smaller. The stretching operation may be performed when the display engine 16 stretches the updated image to fit the final display size as viewed by the user, by utilizing the texture coordinates to extract the portion of the application buffer that the updated image fills. If asynchronous frame updating is carried out, the process of executing the clarification routine at 98 occurs during a first frame update of the display engine, and the process of executing the stretching operation at 88 occurs during a different frame update of the display engine. In this case of asynchronous frame updates, the user may notice visual abnormalities, such as jerkiness of jitter in the image. To avoid jerkiness, the process of executing the stretching operation at 88 and executing the clarification routine at 98 may occur within a single frame update of the display engine, i.e. synchronous frame updates. Synchronous frame updates result in smoother visual transitions when the displayed image updates from a first image at a first resolution to a second image at a second resolution, when compared to asynchronous frame updating.

After the display engine stretches the updated image, at 90, the updated image may be displayed to the user.

At 92, a new virtual distance or change in virtual distance is detected, and the process loops back to step 74.

Figure 3A:
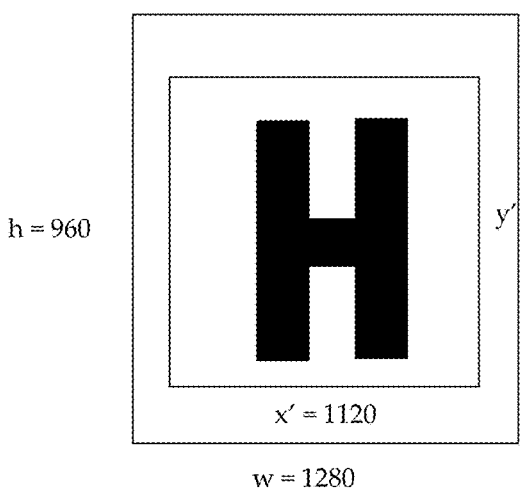
FIG. 3A illustrates an image that is displayed before being resized.
Figure 3B:
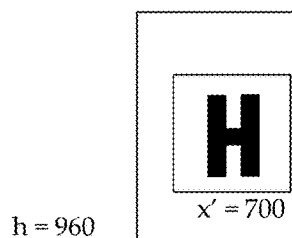
FIG. 3B displays the image after being resized and it has maintained its sharpness.
Figure 3C:
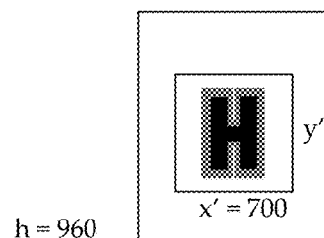
FIG. 3C illustrates the image that has been resized without maintaining its sharpness.

FIG. 3A illustrates the image before being resized. In FIG. 3B, the image has been made smaller. The image remains sharp because of the clarification routine 98 in FIG. 2C that is carried out by the application 20 in FIG. 1. FIG. 3C illustrates that the image is blurry if the clarification routine at 98 is not employed and a mipmapping routine is instead employed as described above. As mentioned above, an image may also be permitted to become blurry if a determination is made at 78 in FIG. 2B that the second virtual distance is more than the maximum threshold distance.

Figure 4A:
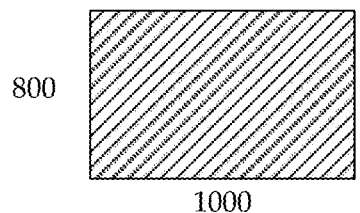
FIGS. 4A to 4F illustrate re-scaling aspects within the context of a browser window.
Figure 4B:
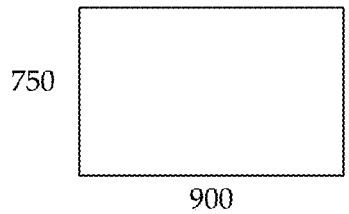
Figure 4C:
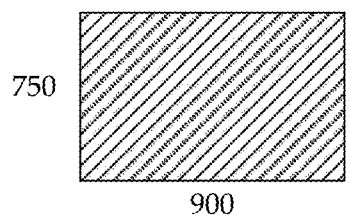

FIGS. 4A to 4F illustrate certain display aspects referred to above in more detail. In FIG. 4A, a buffer, by way of example, has a frame size of 1000×800 and has a texture that fills the entire space (1,1). In FIG. 4B, the space where the image will be displayed in the final render scene (to the user) has been reduced to a frame size of 900×750. In FIG. 4C, the image fills the pixel space. It may, in some embodiments, be required that the display engine 16 in FIG. 1 apply a filter so that a larger texture (1000×800) is displayed within a smaller browser window (900×750). There is thus a reduction in the frame size. If the content is subsequently made smaller, the system, in the absence of the clarification routine at 98 carried out by the application 20, will repeat FIGS. 4B and 4C, which is all that is required for systems that run on a stand-alone computer display.

Figure 4D:
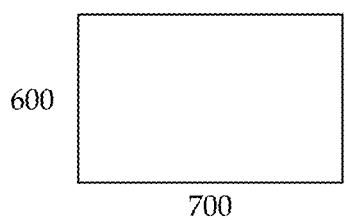
Figure 4E:
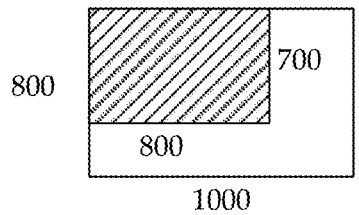
Figure 4F:
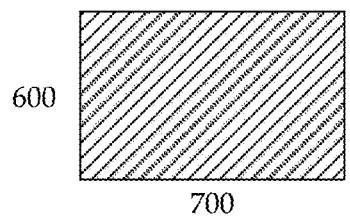

In FIG. 4D, the frame size (i.e. the number of pixels allocated to display the image to the user) is further reduced (700×600). As shown in FIG. 4E, the buffer size has remained unchanged (1000×800). However, the texture size is adjusted according to, in some embodiments, the look-up table 34 (800×700). As shown in FIG. 4F, the display engine 16 in FIG. 1 may apply a filter so that the larger texture (800×700) is displayed within a smaller browser window (700×600). Although a filter is still used in 4F, the difference between the image size in the buffer and the final render size of the image are close enough, to where there should not be a user noticeable decrease in image quality. In situations where the full buffer image (1000×800) needs to be displayed in a relatively small final render size (e.g. 700×600), the filter may reduce the image quality to a user noticeable level. In some embodiments, FIGS. 4D to 4F may be repeated and frame size may be updated when a new distance between the user and displayed image is measured. In some embodiments, the system may wait to adjust the image size until the image has not moved for a threshold period of time, so FIGS. 4D to 4F only need to occur once for given movement of the content relative to the user.

Figure 5:
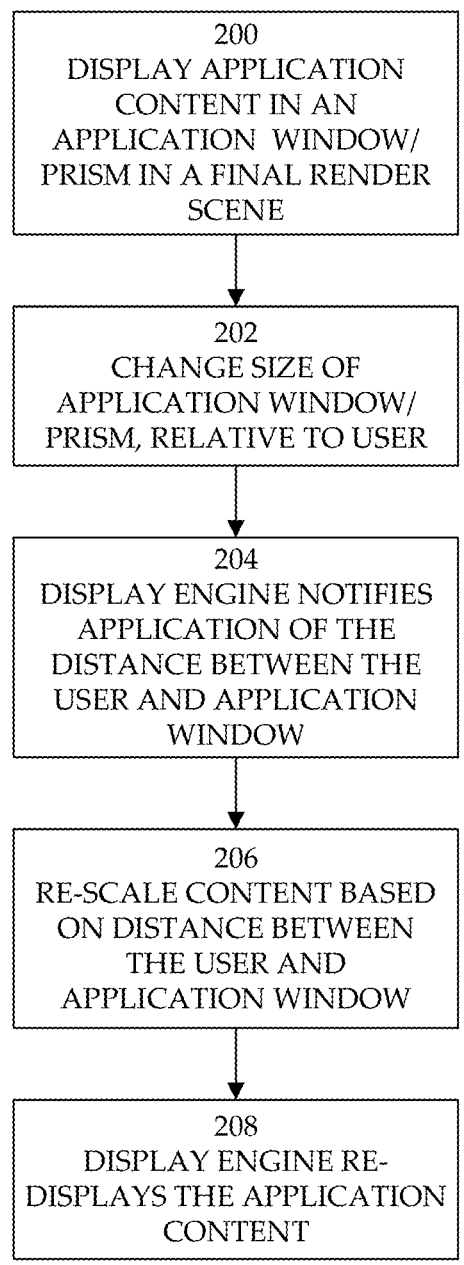
FIG. 5 is a flowchart that illustrates functioning the first embodiment at a high level.

FIG. 5 is a high-level flowchart of the re-scale routine described above. At 200 the application content is displayed in an application window (or prism) in a final render scene. At 202, a size of application window/prism, relative to user is changed. At 204, the display engine 16 notifies the application 20 of the distance between the user and application window. At 206, a re-scale of content based on distance between the user and application window is carried out. At 208, the display engine 16 re-displays the application content.

Figure 6:
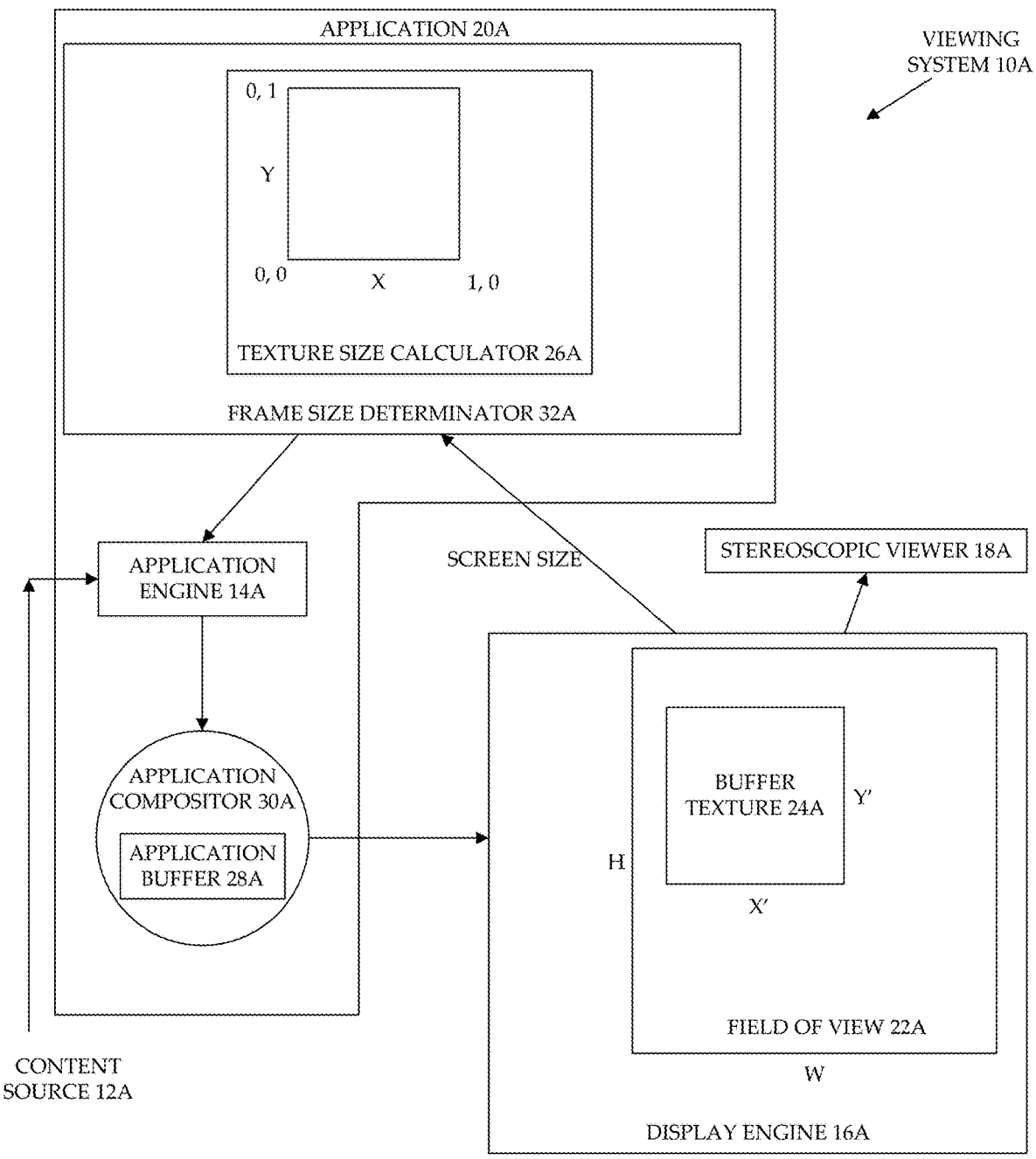
FIG. 6 is block diagram of a viewing system according to a second embodiment of the invention.

FIG. 6 illustrates a viewing system 10A, according to another embodiment of the invention. The viewing system 10A of FIG. 6 is in many respects similar to the viewing system 10 of FIG. 1 and like reference numerals indicate like or similar components.

As discussed with reference to FIG. 1, the display engine 16 provides a user distance to the frame size determinator 32 of the application 20. In FIG. 6, the display engine 16A does not provide a user distance to the frame size determinator 32A of the application 20A. Instead, the display engine 16A provides a screen size to the frame size determinator 32A. The screen size may, for example, be a size corresponding to the buffer texture 24A.

The frame size determinator 32A does not have a look-up table or a look-up algorithm that determines a texture size based on a user distance. Instead, the texture size calculator 26A uses the screen size received from the display engine 16A to determine a desired texture size.

The application engine 14A receives the texture size from the frame size determinator 32A. The application compositor 30A writes the image size in the application buffer 28A. The display engine 16A retrieves the image from the application buffer 28A and display the image to the user within the buffer texture 24A.

Figure 7A:
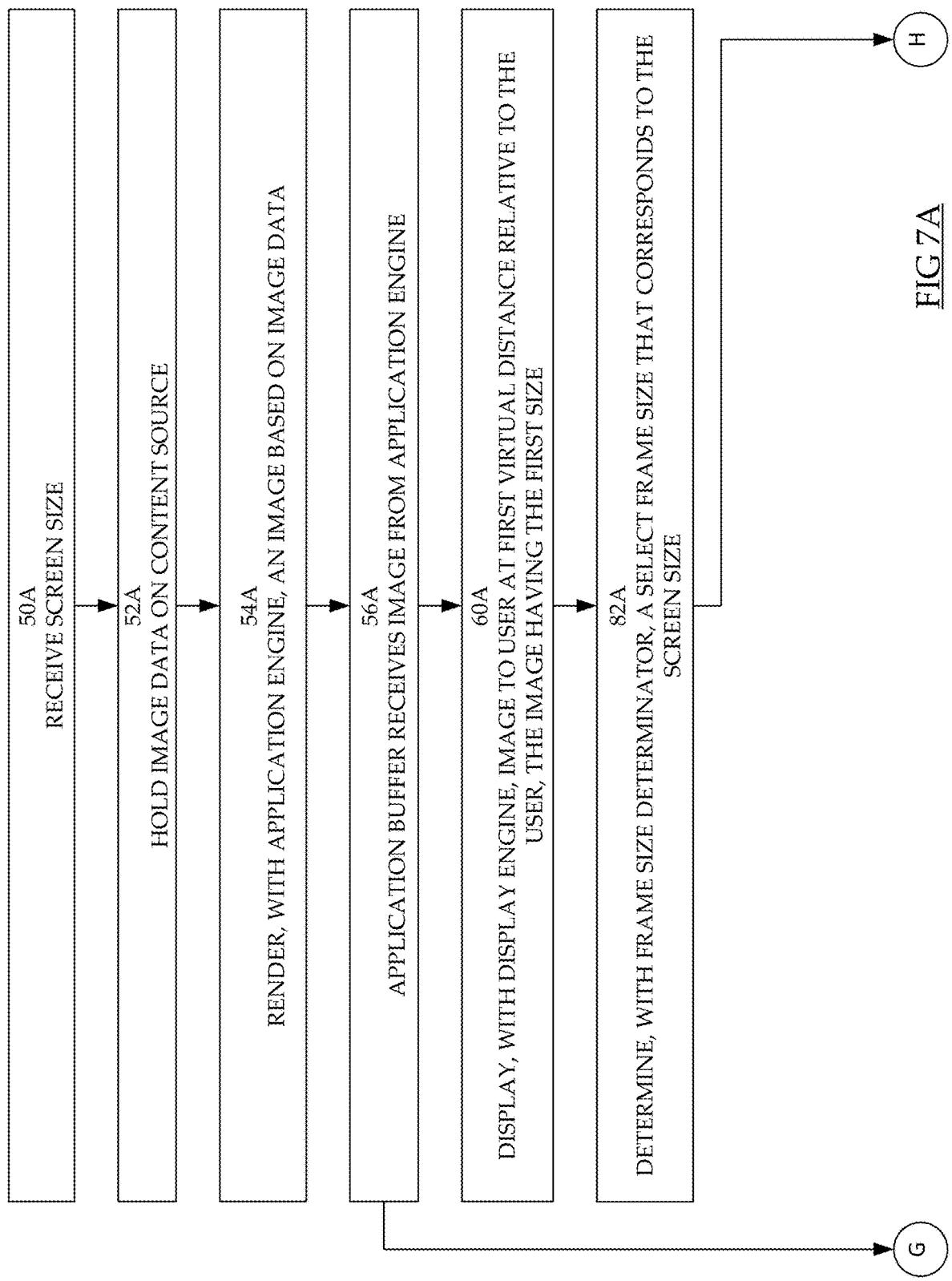
FIGS. 7A and 7B are a flowchart illustrating functioning of the viewing system of FIG. 6.
Figure 7B:
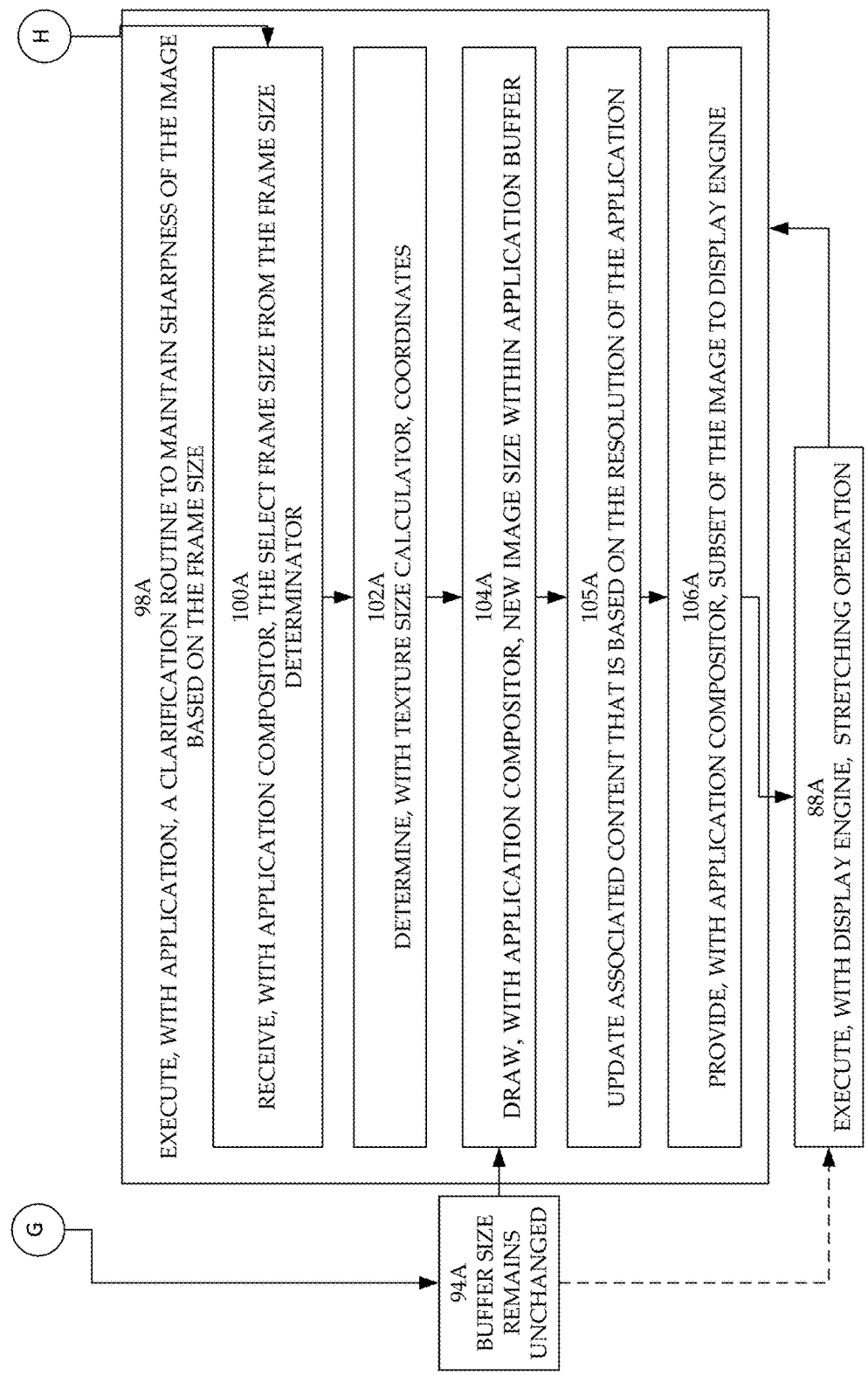

FIGS. 7A and 7B illustrate the functioning of the viewing system 10A of FIG. 6. The operations that are carried out in FIGS. 7A and 7B are similar to the operations that are carried out in FIGS. 2A, 2B and 2C and like reference numerals indicate like or similar operations. The algorithm represented by FIGS. 7A and 7B omits certain operations that are included the algorithm of FIGS. 2A, 2B and 2C, in particular operations at blocks 62 to 78, the operation at block 84 and the operations at blocks 90 and 92.

The viewing system 10 of FIG. 1 has the advantage that texture sizes can be adjusted to accommodate various viewing distances. However, the viewing distances may not always be accurately detected or be detected to a high level of accuracy. The viewing system 10A of FIG. 6 has the advantage that screen sizes are exact sizes, resulting in ultimate texture sizes that are more accurately calculated and displayed to a user. The screen size may still be adjusted based on a detection of movement of the user. However, the screen size remains stable when the user does not move with less "drifting" or inaccuracies that are associated with a movement-based detection system. The user thus perceives less variability in the screen size that is displayed to the user. Although the image may be adjusted from a first size to a second size using either the viewing system 10 of FIG. 1 or the viewing system 10A of FIG. 6, there is less jitter in the image size when using the viewing system 10A of FIG. 6.

Figure 8:
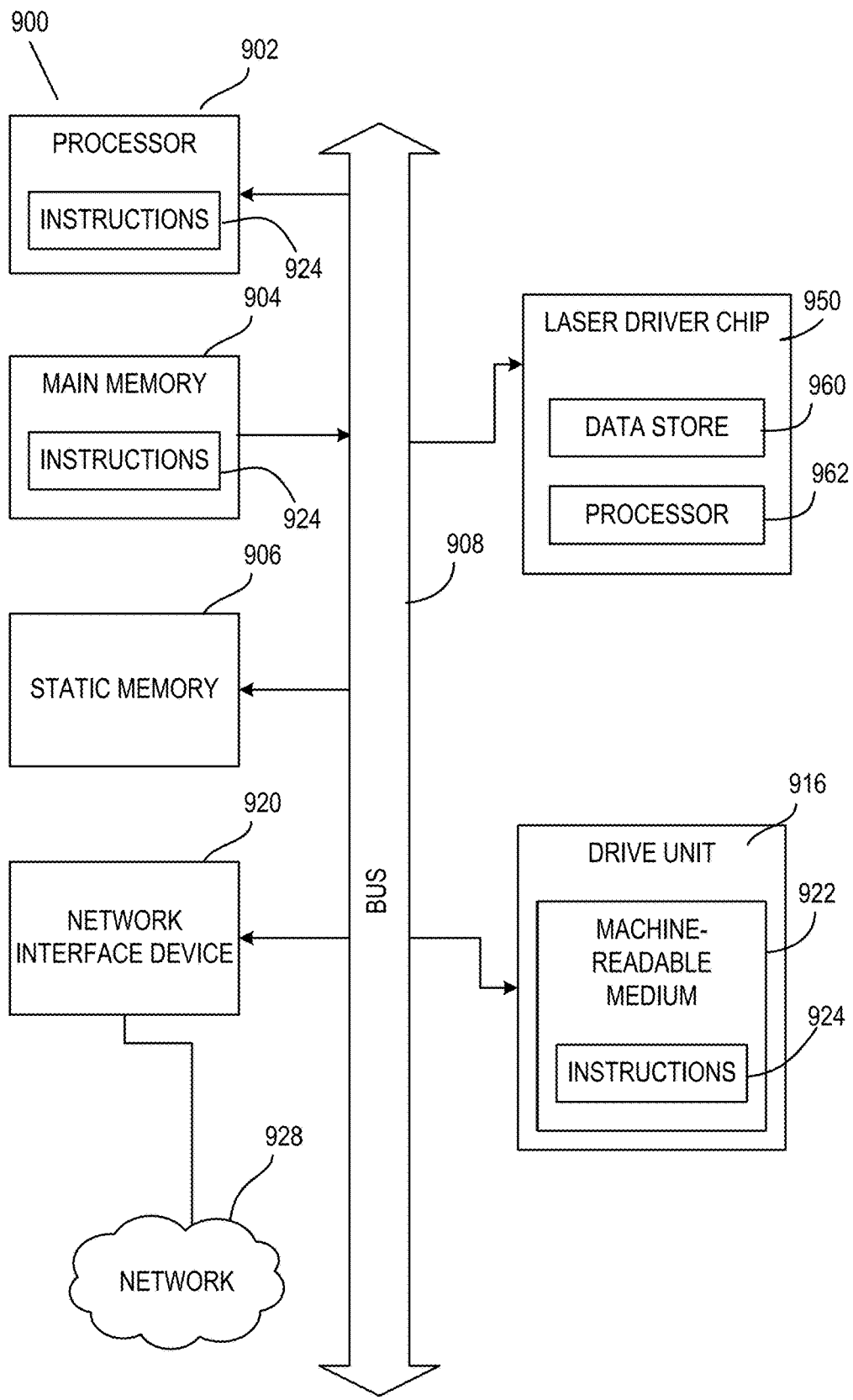
FIG. 8 is a block diagram of a machine in the form of a computer that can find application in the present invention system, in accordance with one embodiment of the invention.

FIG. 8 shows a diagrammatic representation of a machine in the exemplary form of a computer system 900 within which a set of instructions, for causing the machine to perform any one or more of the methodologies discussed herein, may be executed, according to some embodiments. In alternative embodiments, the machine operates as a standalone device or may be connected (e.g., networked) to other machines. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a disk drive unit 916, and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

The computer system 900 includes a laser driver chip 950 that is used to drive projectors to generate laser light. The laser driver chip 950 includes its own data store 960 and its own processor 962.

In some embodiments, the computer system 900 and/or the viewing system 10 may be all or part of the mixed reality system as described in U.S. patent application Ser. No. 14/331,218 which is incorporated by reference herein.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A viewing system comprising:
a content source to hold image data;
an application engine, forming part of an application, communicatively connected to the content source to receive the image data and render an image based on the image data;
a display engine communicatively connected to the application engine to display the image to a user, the image having a first size, the image being adjustable to a second size that is smaller than the first size, wherein the display engine displays the image to a user at a first virtual distance relative to the user and the image having the first size, the image being movable to a second virtual distance relative to the user and the image having the second size that is smaller than the first size;
a movement detection system that detects movement of the image to the second virtual distance relative to the user as a measure indicative of adjustment of the image from the first size to the second size; and
a frame size determinator that determines a select frame size that corresponds to the second virtual distance, wherein the application, in response to the detection, executes a clarification routine to maintain sharpness of the image, the clarification routine being based on the frame size.

2. The viewing system of claim 1, wherein the application includes:
a look-up table having a plurality of distances and a plurality of frame sizes corresponding to the respective distances; and
a look-up algorithm that determines a select distance from the look-up table based to the second virtual distance and determines the select frame size being a frame size corresponding to the select distance.

3. The viewing system of claim 1, wherein the application executes the clarification routine only if the movement from the first virtual distance to the second virtual distance is more than a predetermined minimum threshold distance.

4. The viewing system of claim 3, wherein the application executes the clarification routine only if a predetermined amount of time has passed after the movement from the first virtual distance to the second virtual distance is more than a predetermined minimum threshold distance.

5. The viewing system of claim 1, wherein the application executes the clarification routine only if the movement from the first virtual distance to the second virtual distance is less than a predetermined maximum threshold distance.

6. The viewing system of claim 1, wherein the image is adjustable from the first size to the second size by user interaction with the display engine.

7. The viewing system of claim 1, wherein the application includes:
an application compositor that receives the select frame size from the frame size determinator and the image from the application engine and scales the image based on the frame size.

8. The viewing system of claim 7, wherein the application includes:
an application buffer that receives the image from the application engine, wherein the application compositor draws a subset of the image in the application buffer, the subset having a sample interval based on the select frame size and includes fewer pixels than if the buffer is entirely written.

9. The viewing system of claim 8, wherein fewer processing cycles are required, and less power is consumed, to sample the subset than if the buffer is entirely sampled.

10. The viewing system of claim 8, wherein the application buffer has a size that remains unchanged when the image is moved from the first to the second virtual distance.

11. The viewing system of claim 10, wherein the display engine executes a stretching operation wherein the image is progressively adjusted from the first size to the second size in a series of cycles and a smaller section of the buffer is drawn at for each cycle.

12. The viewing system of claim 1, wherein the application enters the frame size into the application engine and the application engine performs, based on the frame size, a re-layout of a window area, the re-layout maintaining sharpness of the image.

13. The viewing system of claim 12, further comprising:
a stereoscopic viewer connected to the display engine to display the image to the user.

14. The viewing system of claim 1, wherein the image comprises text.

15. The viewing system of claim 1, wherein the display engine provides a screen size to the application engine, a change in the screen size being the measure indicative of the adjustment of the image.

16. A method of viewing content comprising:
rendering, with an application engine, an image based on image data from a content source;
displaying, with a display engine, the image to a user, wherein the image has a first size, the image being adjustable to a second size that is smaller than the first size, wherein the display engine displays the image to a user at a first virtual distance relative to the user and the image having the first size, the image being movable to a second virtual distance relative to the user and the image having the second size that is smaller than the first size;
detecting, with a movement detection system, movement of the image to the second virtual distance relative to the user as a measure indicative of adjustment of the image from the first size to the second size;
determining, with a frame size determinator of the application, a select frame size that corresponds to the second virtual distance; and
executing, with an application, in response to the detection, a clarification routine to maintain sharpness of the image, the clarification routine being based on the frame size.

17. The method of claim 16, wherein execution of the application includes:
determining, with a look-up algorithm, a select distance from a look-up table, having a plurality of distances and a plurality of frame sizes corresponding to the respective distances, based to the second virtual distance; and
determining, with the look-up algorithm, the select frame size being a frame size corresponding to the select distance.

18. The method of claim 17, wherein the application executes the clarification routine only if the movement from the first virtual distance to the second virtual distance is more than a predetermined minimum threshold distance.

19. The method of claim 18, wherein the application executes the clarification routine only if a predetermined amount of time has passed after the movement from the first virtual distance to the second virtual distance is more than a predetermined minimum threshold distance.

20. The method of claim 16, wherein the application executes the clarification routine only if the movement from the first virtual distance to the second virtual distance is less than a predetermined maximum threshold distance.

21. The method of claim 16, wherein the image is adjustable from the first size to the second size by user interaction with the display engine.

22. The method of claim 16, wherein execution of the application includes:
   receiving, with an application compositor of the application, the select frame size from the frame size determinator; and
   scaling, with the application compositor of the application, the image based on the frame size.

23. The method of claim 22, further comprising:
   receiving, with an application buffer of the application, the image from the application engine, wherein the application compositor draws a subset of the image in the application buffer, the subset having a sample interval based on the select frame size and includes fewer pixels than if the buffer is entirely written.

24. The method of claim 23, wherein fewer processing cycles are required, and less power is consumed, to sample the subset than if the buffer is entirely sampled.

25. The method of claim 23, wherein the application buffer has a size that remains unchanged when the image is moved from the first to the second virtual distance.

26. The method of claim 25, wherein the display engine executes a stretching operation wherein the image is progressively adjusted from the first size to the second size in a series of cycles and a smaller section of the buffer is drawn at for each cycle.

27. The method of claim 16, further comprising:
   entering, with the application, the frame size into the application engine; and
   performing with the application engine, based on the frame size, a re-layout of a window area, the re-layout maintaining sharpness of the image.

28. The method of claim 27, further comprising:
   displaying the image to the user with a stereoscopic viewer connected to the display engine.

29. The method of claim 16, wherein the image comprises text.

30. The method of claim 16, wherein the display engine provides a screen size to the application engine, a change in the screen size being the measure indicative of the adjustment of the image.

31. A viewing system comprising:
   a content source to hold image data;
   an application engine, forming part of an application, communicatively connected to the content source to receive the image data and render an image based on the image data;
   a display engine communicatively connected to the application engine to display the image to a user, the image having a first size, the image being adjustable to a second size that is smaller than the first size, wherein the display engine displays the image to a user at a first virtual distance relative to the user and the image having the first size, the image being movable to a second virtual distance relative to the user and the image having the second size that is smaller than the first size; and
   a movement detection system that detects movement of the image to the second virtual distance relative to the user as a measure indicative of adjustment of the image from the first size to the second size, wherein the application, in response to the detection, executes a clarification routine to maintain sharpness of the image, wherein the application executes the clarification routine only if the movement from the first virtual distance to the second virtual distance is more than a predetermined minimum threshold distance.

32. The viewing system of claim 31, wherein the application includes:
   a frame size determinator that determines a select frame size that corresponds to the second virtual distance, the clarification routine being based on the frame size.

33. The viewing system of claim 32, wherein the application includes:
   a look-up table having a plurality of distances and a plurality of frame sizes corresponding to the respective distances; and
   a look-up algorithm that determines a select distance from the look-up table based to the second virtual distance and determines the select frame size being a frame size corresponding to the select distance.

34. The viewing system of claim 32, wherein the application executes the clarification routine only if a predetermined amount of time has passed after the movement from the first virtual distance to the second virtual distance is more than a predetermined minimum threshold distance.

35. The viewing system of claim 32, wherein the application executes the clarification routine only if the movement from the first virtual distance to the second virtual distance is less than a predetermined maximum threshold distance.

36. The viewing system of claim 31, wherein the application includes:
   an application compositor that receives the select frame size from the frame size determinator and the image from the application engine and scales the image based on the frame size.

37. The viewing system of claim 36, wherein the application includes:
   an application buffer that receives the image from the application engine, wherein the application compositor draws a subset of the image in the application buffer, the subset having a sample interval based on the select frame size and includes fewer pixels than if the buffer is entirely written.

38. The viewing system of claim 37, wherein fewer processing cycles are required, and less power is consumed, to sample the subset than if the buffer is entirely sampled.

39. The viewing system of claim 37, wherein the application buffer has a size that remains unchanged when the image is moved from the first to the second virtual distance.

40. The viewing system of claim 39, wherein the display engine executes a stretching operation wherein the image is progressively adjusted from the first size to the second size in a series of cycles and a smaller section of the buffer is drawn at for each cycle.

41. The viewing system of claim 31, wherein the application enters the frame size into the application engine and the application engine performs, based on the frame size, a re-layout of a window area, the re-layout maintaining sharpness of the image.

42. The viewing system of claim 41, further comprising:
   a stereoscopic viewer connected to the display engine to display the image to the user.

43. The viewing system of claim 31, wherein the image comprises text.

44. The viewing system of claim 31, wherein the display engine provides a screen size to the application engine, a change in the screen size being the measure indicative of the adjustment of the image.

45. A method of viewing content comprising:
rendering, with an application engine, an image based on image data from a content source;
displaying, with a display engine, the image to a user, wherein the image has a first size, the image being adjustable to a second size that is smaller than the first size, wherein the display engine displays the image to a user at a first virtual distance relative to the user and the image having the first size, the image being movable to a second virtual distance relative to the user and the image having the second size that is smaller than the first size;
detecting, with a movement detection system, movement of the image to the second virtual distance relative to the user as a measure indicative of adjustment of the image from the first size to the second size; and
executing, with an application, in response to the detection, a clarification routine to maintain sharpness of the image, wherein the application executes the clarification routine only if the movement from the first virtual distance to the second virtual distance is more than a predetermined minimum threshold distance.

46. The method of claim 45, wherein the application includes:
determining, with a frame size determinator of the application, a select frame size that corresponds to the second virtual distance, the clarification routine being based on the frame size.

47. The method of claim 46, wherein execution of the application includes:
determining, with a look-up algorithm, a select distance from a look-up table, having a plurality of distances and a plurality of frame sizes corresponding to the respective distances, based to the second virtual distance; and
determining, with the look-up algorithm, the select frame size being a frame size corresponding to the select distance.

48. The method of claim 47, wherein the application executes the clarification routine only if a predetermined amount of time has passed after the movement from the first virtual distance to the second virtual distance is more than a predetermined minimum threshold distance.

49. The method of claim 45, wherein the application executes the clarification routine only if the movement from the first virtual distance to the second virtual distance is less than a predetermined maximum threshold distance.

50. The method of claim 45, wherein execution of the application includes:
receiving, with an application compositor of the application, the select frame size from the frame size determinator; and
scaling, with the application compositor of the application, the image based on the frame size.

51. The method of claim 50, further comprising:
receiving, with an application buffer of the application, the image from the application engine, wherein the application compositor draws a subset of the image in the application buffer, the subset having a sample interval based on the select frame size and includes fewer pixels than if the buffer is entirely written.

52. The method of claim 51, wherein fewer processing cycles are required, and less power is consumed, to sample the subset than if the buffer is entirely sampled.

53. The method of claim 51, wherein the application buffer has a size that remains unchanged when the image is moved from the first to the second virtual distance.

54. The method of claim 53, wherein the display engine executes a stretching operation wherein the image is progressively adjusted from the first size to the second size in a series of cycles and a smaller section of the buffer is drawn at for each cycle.

55. The method of claim 45, further comprising:
entering, with the application, the frame size into the application engine; and
performing with the application engine, based on the frame size, a re-layout of a window area, the re-layout maintaining sharpness of the image.

56. The method of claim 55, further comprising:
displaying the image to the user with a stereoscopic viewer connected to the display engine.

57. The method of claim 45, wherein the image comprises text.

58. The method of claim 45, wherein the display engine provides a screen size to the application engine, a change in the screen size being the measure indicative of the adjustment of the image.

59. A viewing system comprising:
a content source to hold image data;
an application engine, forming part of an application, communicatively connected to the content source to receive the image data and render an image based on the image data;
a display engine communicatively connected to the application engine to display the image to a user, the image having a first size, the image being adjustable to a second size that is smaller than the first size, wherein the display engine displays the image to a user at a first virtual distance relative to the user and the image having the first size, the image being movable to a second virtual distance relative to the user and the image having the second size that is smaller than the first size; and
a movement detection system that detects movement of the image to the second virtual distance relative to the user as a measure indicative of adjustment of the image from the first size to the second size, wherein the application, in response to the detection, executes a clarification routine to maintain sharpness of the image, wherein the application executes the clarification routine only if the movement from the first virtual distance to the second virtual distance is less than a predetermined maximum threshold distance.

60. The viewing system of claim 59, wherein the application includes:
a frame size determinator that determines a select frame size that corresponds to the second virtual distance, the clarification routine being based on the frame size.

61. The viewing system of claim 60, wherein the application includes:
a look-up table having a plurality of distances and a plurality of frame sizes corresponding to the respective distances; and
a look-up algorithm that determines a select distance from the look-up table based to the second virtual distance and determines the select frame size being a frame size corresponding to the select distance.

62. The viewing system of claim 59, wherein the application executes the clarification routine only if the movement from the first virtual distance to the second virtual distance is more than a predetermined minimum threshold distance.

63. The viewing system of claim 62, wherein the application executes the clarification routine only if a predetermined amount of time has passed after the movement from the first virtual distance to the second virtual distance is more than a predetermined minimum threshold distance.

64. The viewing system of claim 59, wherein the application includes:
an application compositor that receives the select frame size from the frame size determinator and the image from the application engine and scales the image based on the frame size.

65. The viewing system of claim 64, wherein the application includes:
an application buffer that receives the image from the application engine, wherein the application compositor draws a subset of the image in the application buffer, the subset having a sample interval based on the select frame size and includes fewer pixels than if the buffer is entirely written.

66. The viewing system of claim 65, wherein fewer processing cycles are required, and less power is consumed, to sample the subset than if the buffer is entirely sampled.

67. The viewing system of claim 65, wherein the application buffer has a size that remains unchanged when the image is moved from the first to the second virtual distance.

68. The viewing system of claim 67, wherein the display engine executes a stretching operation wherein the image is progressively adjusted from the first size to the second size in a series of cycles and a smaller section of the buffer is drawn at for each cycle.

69. The viewing system of claim 59, wherein the application enters the frame size into the application engine and the application engine performs, based on the frame size, a re-layout of a window area, the re-layout maintaining sharpness of the image.

70. The viewing system of claim 69, further comprising:
a stereoscopic viewer connected to the display engine to display the image to the user.

71. The viewing system of claim 59, wherein the image comprises text.

72. The viewing system of claim 59, wherein the display engine provides a screen size to the application engine, a change in the screen size being the measure indicative of the adjustment of the image.

73. A method of viewing content comprising:
rendering, with an application engine, an image based on image data from a content source;
displaying, with a display engine, the image to a user, wherein the image has a first size, the image being adjustable to a second size that is smaller than the first size, wherein the display engine displays the image to a user at a first virtual distance relative to the user and the image having the first size, the image being movable to a second virtual distance relative to the user and the image having the second size that is smaller than the first size;
detecting, with a movement detection system, movement of the image to the second virtual distance relative to the user as a measure indicative of adjustment of the image from the first size to the second size; and
executing, with an application, in response to the detection, a clarification routine to maintain sharpness of the image, wherein the application executes the clarification routine only if the movement from the first virtual distance to the second virtual distance is less than a predetermined maximum threshold distance.

74. The method of claim 73, wherein the application includes:
determining, with a frame size determinator of the application, a select frame size that corresponds to the second virtual distance, the clarification routine being based on the frame size.

75. The method of claim 74, wherein execution of the application includes:
determining, with a look-up algorithm, a select distance from a look-up table, having a plurality of distances and a plurality of frame sizes corresponding to the respective distances, based to the second virtual distance; and
determining, with the look-up algorithm, the select frame size being a frame size corresponding to the select distance.

76. The viewing system of claim 73, wherein the application executes the clarification routine only if the movement from the first virtual distance to the second virtual distance is more than a predetermined minimum threshold distance.

77. The method of claim 76, wherein the application executes the clarification routine only if a predetermined amount of time has passed after the movement from the first virtual distance to the second virtual distance is more than a predetermined minimum threshold distance.

78. The method of claim 73, wherein the application includes:
receiving, with an application compositor of the application, the select frame size from the frame size determinator; and
scaling, with the application compositor of the application, the image based on the frame size.

79. The method of claim 78, further comprising:
receiving, with an application buffer of the application, the image from the application engine, wherein the application compositor draws a subset of the image in the application buffer, the subset having a sample interval based on the select frame size and includes fewer pixels than if the buffer is entirely written.

80. The method of claim 79, wherein fewer processing cycles are required, and less power is consumed, to sample the subset than if the buffer is entirely sampled.

81. The method of claim 79, wherein the application buffer has a size that remains unchanged when the image is moved from the first to the second virtual distance.

82. The method of claim 81, wherein the display engine executes a stretching operation wherein the image is progressively adjusted from the first size to the second size in a series of cycles and a smaller section of the buffer is drawn at for each cycle.

83. The method of claim 73, further comprising:
entering, with the application, the frame size into the application engine; and
performing with the application engine, based on the frame size, a re-layout of a window area, the re-layout maintaining sharpness of the image.

84. The method of claim 83, further comprising:
displaying the image to the user with a stereoscopic viewer connected to the display engine.

85. The method of claim 73, wherein the image comprises text.

86. The method of claim 73, wherein the display engine provides a screen size to the application engine, a change in the screen size being the measure indicative of the adjustment of the image.

* * * * *